Patented May 16, 1944

2,349,210

UNITED STATES PATENT OFFICE 2,349,210

PROCESS FOR IMPROVING THE COLOR OF RESINOUS COPOLYMERS OF TERPENES

William N. Traylor, Hattiesburg, Miss., assignor to Hercules Powder Company, Wilmington, Del., a corporation of Delaware No Drawing. Application June 21, 1941, Serial No. 399,209

18 Claims. (Cl. 260—86)

This invention relates to terpene copolymers and more particularly to a process for refining terpene copolymers.

The terpene copolymers are a useful and relatively inexpensive class of resins. However, the preparation of the more valuable pale colored terpene copolymers has been difficult and expensive. Thus, while it has been possible to secure light grades of such copolymers by using carefully purified raw materials and by extremely careful control of polymerization conditions, such practice has led to limitations in the use of raw materials and in choice of polymerization conditions and finally to increased cost of the pale copolymers. Moreover, no satisfactory process for refining the dark-colored terpene copolymers to produce pale copolymers has been developed.

It is an object of this invention to provide a process for refining terpene copolymers.

It is a further object of this invention to provide a process for refining terpene copolymers which is simple and economical.

A further object of this invention is to provide a process for refining terpene copolymers which will provide a substantially quantitative yield of refined terpene copolymers based on the terpene copolymers treated.

It is a still further object of this invention to provide a process for refining terpene copolymers wherein the properties of the refined copolymers other than color are substantially unchanged.

Other objects will appear hereinafter.

The objects of this invention in general are accomplished by treating the terpene copolymers with nascent hydrogen. The treatment is carried out under conditions which will provide intimate contact between the terpene copolymers and the nascent hydrogen. As a result, the color of the terpene copolymers becomes substantially lightened with practically no loss in yield and no perceptible effect on the other physical properties.

In accordance with the process of this invention, the treatment with nascent hydrogen may be carried out with the terpene copolymers dissolved in a suitable solvent or in a molten condition. After such treatment, the solution of terpene copolymers or the molten terpene copolymers may be washed with water to remove any water-soluble material and filtered to remove any suspended matter. Recovery of the refined copolymers may be accomplished by reduced pressure distillation of the solvent, if one has been employed in the process.

The process of this invention is applicable to the class of resinous materials which may be defined broadly as terpene copolymers. The materials comprising this class are the products of the copolymerization of terpenes with other unsaturated organic compounds which compounds are themselves capable of polymerization. For illustration, then, the terpenes which may be employed comprise acyclic terpenes, as allo-ocimene, ocimene, myrcene, cryptotaenene, etc.; monocyclic terpenes, as dipentene, alpha-terpinene, beta-terpinene, gamma-terpinene, terpinolene, sylvestrene, alpha - phellandrene, beta-phellandrene, origanene, the pyronenes, etc.; and bicyclic terpenes, as alpha-thujene, beta-thujene, sabinene, the carenes, alpha-pinene, beta-pinene, camphene, bornylene, alpha-fenchene, beta-fenchene, gamma-fenchene, etc. Variously, synthetic or naturally-occurring mixtures of the aforesaid terpenes may be utilized.

The unsaturated organic compounds which are themselves capable of polymerization and which are employed in preparing the copolymer resins comprise a large group of operable materials. For example, this group includes 1,3-butadiene or a suitable derivative thereof, as (2-methyl-1,3-butadiene), (2,3-dimethyl-1,3-butadiene), (2-ethyl-1,3-butadiene), (2-chloro - 1,3 - butadiene), (2-bromo-1,3-butadiene), (2-phenyl - 1,3 - butadiene), etc.; unsaturated aromatic compounds, as coumarone-indene, coumarone, indene, vinyl benzene, ortho-methyl vinyl benzene, meta-methyl vinyl benzene, para-methyl vinyl benzene, divinyl benzene, propenyl benzene, isopropenyl benzene, allyl benzene, anethol, methyl chavicol, etc.; alicyclic hydrocarbons containing conjugated systems of double bonds, as cyclopentadiene, (1,3-cyclohexadiene), (1,3 - cycloheptadiene), (1,3,5-cycloheptatriene), etc.; halides of unsaturated hydrocarbons, as vinyl chloride, vinyl bromide, vinylidene chloride, vinylidene bromide, allyl chloride, methallyl chloride, crotyl chloride, etc.; and resin acids, as abietic, sapinic, pimaric, sylvic, etc. acids.

As solvents for the terpene copolymers, any solvent which is itself inert in the treatment may be employed. Among such solvents are, for example, monocyclic aromatic hydrocarbons, as benzene, toluene, xylene, etc.; petroleum hydrocarbons, as gasoline, V. M. and P. naphtha, hexane, heptane, etc.; hydrogenated petroleum hydrocarbons, as those known in the trade as "Solvesso" solvents; and solvents such as ethylene dichloride, carbon tetrachloride, cyclohexane, methyl cyclohexane, tetrahydronaphthalene, decahydronaphthalene, etc.

It will be particularly desirable to carry out the treatment of the copolymers in solution where the melting point of the copolymer is selectively high in order that the terpene copolymer will be in a state sufficiently fluid for adequate washability at practicable temperatures. Filtration and water washing of the higher melting copolymers will likewise preferably be carried out with the copolymers dissolved in a suitable solvent.

The concentration of the terpene copolymers in the solution is not critical and may be selected so as to provide adequate workability of the solution. In general, a concentration within the range of about 10 to about 75% by weight may be used, but preferably the concentration is held within the range of about 30% to 50% by weight.

The nascent hydrogen for use in the treatment of the terpene copolymers in accordance with this invention may be provided by any of the well-known procedures for generating nascent hydrogen. Preferably, the nascent hydrogen may be provided by the reaction under ionizing conditions of an acid reactant with a metal above hydrogen in the electromotive series. The acid reactant may be either an acid or an acid salt or a mixture thereof. Among the acid reactants which may be used are for example, hydrochloric acid, sulfuric acid, phosphoric acid, acetic acids, sodium acid sulfate, potassium acid sulfate, monosodium acid phosphate, calcium acid phosphate, etc. The preferred acid reactants are the acid salts, sodium acid sulfate being particularly effective.

Any of the metals above hydrogen in the electromotive series may be employed. It will be preferable, however, to use such metals which form salts having no appreciable discoloring action on the terpene copolymers. The metals are used preferably though not necessarily in a finely divided form. Use of metals such as, for example, cadmium, aluminum, manganese, tin, and zinc is very desirable. Zinc in the form of zinc dust, mossy zinc, or zinc powder is particularly well adapted to the process. It will be desirable that at least a small amount of water or of some other ionizing solvent be present to accelerate the refining action. Use of an aqueous acid or of the hydrate of an acid salt, for example, will provide the desired ionizing effect. It will be understood that the acid reactant and the metal are both in contact with the terpene copolymers during the treatment.

The nascent hydrogen may likewise be produced electrolytically. When using nascent hydrogen produced by electrolysis, the terpene copolymers dissolved in a suitable solvent will, for example, be placed in a suitable electrolytic cell. An aqueous acid solution or an aqueous salt solution will then be added to provide ionization, and a direct current will then be passed through the cell for a length of time dependent on the current and the degree of refining desired, while vigorously agitating the mixture.

It is desirable to employ vigorous agitation in carrying out the refining treatment of this invention to obtain thorough contact of the reactants and to accelerate the refining action. The speed with which the terpene copolymers become refined is also dependent on the temperature employed in the treatment. While the treatment may be carried out at room temperature with the copolymers dissolved in a suitable solvent, the rate of refining is rather slow for practical purposes. It is preferable to carry out the treatment at elevated temperatures, and temperatures as high as 200° C. have been found to be satisfactory although higher temperatures are possible. A temperature within the range of about 70° C. to about 125° C. is preferable. When carrying out the treatment of the terpene copolymers in solution, it is convenient to maintain the temperature at the reflux temperature. When the treatment is to be carried out above the reflux temperature of the solution, superatmospheric pressure is required.

The time of treatment of the terpene copolymers may be varied to produce the result desired. The time necessary to provide satisfactory refining of the terpene copolymers will be dependent on such factors as the amount of color bodies present in the terpene copolymers, the temperature of treatment, the amount of nascent hydrogen utilized, etc. For this reason, it is impossible to state any definite time necessary, except in relation to a given set of conditions. The examples which follow serve to illustrate the time of treatment which may be used in any particular case.

The amount of acid reactant used for producing nascent hydrogen, when this method of generating nascent hydrogen is employed, may vary over a wide range, depending on such factors as the particular acid used, the degree of refining desired, the particular conditions of treatment, as well as other factors. Assuming the acid reactant to be on the anhydrous basis, ratios of terpene copolymer to acid reactant as high as 40 on a weight basis have been used. In general, however, for batch operations, ratios of terpene copolymer to acid reactant between about 10 and about 1 are desirable. The most preferred ratio is about 3.0.

As hereinbefore stated, the refining treatment of this invention will be carried out with at least a small amount of water or some other ionizing solvent present to accelerate the refining action. Thus, if the acid reactant being employed is an acid salt, it may be employed in the form of a hydrate, if it forms one, or in the form of an aqueous solution. Sodium acid sulfate in the form of its monohydrate is particularly desirable. Alternatively, a small amount of water or other ionizing solvent may be added. If the acid reactant being employed is an acid, it may be employed in the form of aqueous solutions of varying concentrations, or, as desired, the anhydrous acid may be added and a small amount of water or other ionizing solvent thereafter added.

The amount of metal above hydrogen in the electromotive series which is employed is not particularly critical. It will be preferable, however, to have such an amount of metal present which will be an excess over the theoretical amount required to react with the acid reactant present.

The process of refining terpene copolymers in accordance with this invention may be carried out as a continuous process if desired. Thus, for example, the terpene copolymer solution may be treated with the acid reactant and the metal above hydrogen in the electromotive series in a suitable vessel while additional terpene copolymer solution is led into the vessel continuously and refined terpene copolymer solution is withdrawn from the vessel at substantially the same rate. The refined solution will then be washed with water, filtered and finally passed to a continuous evaporator for removal of the solvent. The use of an inert atmosphere, as nitrogen or carbon dioxide, during the various refining steps is often of assistance in obtaining pale colors.

As illustrative of the process of refining terpene copolymers in accordance with this invention, the examples appearing below are cited as typical of the various embodiments. The colors shown in the examples are those corresponding to the color grades of the Standard U. S. Rosin Type.

*Example 1*

A terpene copolymer was prepared as follows. Five hundred and sixty parts by weight of steam distilled wood turpentine, and 450 parts by weight of a coumarone-indene fraction containing 65% coumarone-indene were dissolved in 1500 parts by weight of ethylene dichloride. To this solution were added 15.5 parts of anhydrous AlCl₃ over a period of one hour with agitation. The temperature was maintained below 65° C. during this treatment. The homogeneous reaction mixture obtained was allowed to stand at 10° C. for 24 hours, then was washed with aqueous 5% HCl at 100° C. to remove the catalyst. The reaction mixture was then water washed, and the solvent was removed by vacuum distillation. Eight hundred and twenty parts by weight of a resin was obtained having a drop melting point of 105° C. and a color grade of G.

Sixty-two parts by weight of this copolymer were dissolved in 190 parts by weight of benzene, and the solution was refluxed for one hour with 20 parts by weight of zinc powder and 30 parts by weight of $NaHSO_4 \cdot H_2O$. The solution was decanted, water washed, filtered, and the solvent removed by vacuum distillation. The refined resin had a drop melting point of 105° C. and a color grade of I.

The above refining process was duplicated with the exception that 25 parts by weight of 15% HCl replaced the 30 parts by weight of $NaHSO_4 \cdot H_2O$ previously used. The resin treated in this manner was lightened in color to a grade of H.

*Example 2*

Example 1 was duplicated replacing the coumarone-indene fraction with 300 parts of styrene (vinyl benzene). A yield of 710 parts of copolymer was obtained having a color grading I. This resin was refined by a treatment carried out as in Example 1, and a refined product of color grading M was obtained.

*Example 3*

Alpha-pinene was cracked to a mixture of 40% allo-ocimene and 60% monocyclic terpenes by passing it in the vapor state through a heated tube at 385° C. to 395° C. One hundred and forty parts by weight of anhydrous AlCl₃ were then added to 1250 parts by weight of ethylene dichloride. This mixture was cooled to 5° C. and 750 parts by weight of the cracked alpha-pinene mixture was added over a period of 2 hours with agitation and cooling at 15 to 20° C. Agitation was continued at 20° C. for ½ hour. Water and ice were added with agitation to decompose the catalyst-polymer complex. The ethylene dichloride phase was separated and washed with hot water. The ethylene dichloride was then removed by steam distillation. A resin having a drop melting point of 84° C. and a color grade F was recovered.

Seventy-five parts by weight of the copolymer thus prepared was dissolved in 310 parts by weight of benzene. The solution was refluxed for one hour with 15 parts by weight of zinc powder and 23 parts by weight of $NaHSO_4 \cdot H_2O$. After filtering, water washing and removal of the solvent by vacuum distillation, the refined resin had a color grade I+.

It will be understood that the details and examples hereinbefore set forth are illustrative only and that the invention as broadly described and claimed is in no way limited thereby.

What I claim and desire to protect by Letters Patent is:

1. A process for refining a terpene resinous copolymer of a terpene obtained from turpentine and another polymerizable unsaturated organic compound which comprises mixing said copolymer resin, dissolved in a solvent, with an acid reactant and a metal above hydrogen in the electromotive series in the presence of at least a small amount of water.

2. A process for refining a terpene resinous copolymer of a pinene and another unsaturated polymerizable organic compound which comprises mixing said copolymer resin, dissolved in a solvent, with an acid reactant and a metal above hydrogen in the electromotive series in the presence of at least a small amount of water.

3. A process for refining a terpene resinous copolymer of a pinene and styrene which comprises mixing said copolymer resin, dissolved in a solvent, with an acid reactant and a metal above hydrogen in the electromotive series in the presence of at least a small amount of water.

4. A process for refining a terpene resinous copolymer of a pinene and styrene which comprises mixing said copolymer resin, dissolved in a solvent, with sodium acid sulfate and zinc in the presence of at least a small amount of water.

5. A process for refining a terpene resinous copolymer of an unsaturated hydrocarbon terpene and another polymerizable unsaturated organic compound which comprises treating said copolymer resin with nascent hydrogen in the presence of at least a small amount of water.

6. A process for refining a terpene resinous copolymer of an unsaturated hydrocarbon terpene and another polymerizable unsaturated organic compound which comprises treating said copolymer resin, dissolved in a solvent, with nascent hydrogen in the presence of at least a small amount of water.

7. A process for refining a terpene resinous copolymer of an unsaturated hydrocarbon terpene and another polymerizable unsaturated organic compound which comprises mixing said copolymer resin with an acid reactant and a metal above hydrogen in the electromotive series in the presence of at least a small amount of water.

8. A process of refining a terpene resinous copolymer of an unsaturated hydrocarbon terpene and another polymerizable unsaturated organic compound which comprises treating said copolymer, dissolved in a solvent, with an acid reactant and a metal above hydrogen in the electromotive series in the presence of at least a small amount of water.

9. A process of refining a terpene resinous copolymer of an unsaturated hydrocarbon terpene and another polymerizable unsaturated organic compound which comprises treating said copolymer, dissolved in a solvent, with an acid reactant and zinc in the presence of at least a small amount of water.

10. A process of refining a terpene resinous copolymer of an unsaturated hydrocarbon terpene and another polymerizable unsaturated organic compound which comprises treating said copolymer, dissolved in a solvent, with an acid and a metal above hydrogen in the electromotive series in the presence of at least a small amount of water.

11. A process of refining a terpene resinous copolymer of an unsaturated hydrocarbon terpene and another polymerizable unsaturated organic compound which comprises treating said copolymer, dissolved in a solvent, with an acid salt and a metal above hydrogen in the electromotive series in the presence of at least a small amount of water.

12. A process of refining a terpene resinous copolymer of an unsaturated hydrocarbon terpene and another polymerizable unsaturated organic compound which comprises treating said copolymer, dissolved in a solvent, with sodium acid sulfate and a metal above hydrogen in the electromotive series in the presence of at least a small amount of water.

13. A process of refining a terpene resinous copolymer of an unsaturated hydrocarbon terpene and another polymerizable unsaturated organic compound which comprises treating said copolymer, dissolved in a solvent, with sodium acid sulfate and zinc in the presence of at least a small amount of water.

14. A process of refining a terpene resinous copolymer of an unsaturated hydrocarbon terpene and another polymerizable unsaturated organic compound which comprises treating said copolymer, dissolved in a solvent, with sodium acid sulfate monohydrate and zinc in the presence of at least a small amount of water.

15. A process of refining a terpene resinous copolymer of an unsaturated hydrocarbon terpene and another polymerizable unsaturated organic compound which comprises treating said copolymer, dissolved in a solvent, with an acid reactant and a metal above hydrogen in the electromotive series in the presence of at least a small amount of water, the temperature of the copolymer being maintained between about 70° C. and about 125° C. during the treatment.

16. A process of refining a terpene resinous copolymer of an unsaturated hydrocarbon terpene and another polymerizable unsaturated organic compound which comprises treating said copolymer, dissolved in a solvent, with sodium acid sulfate monohydrate and zinc in the presence of at least a small amount of water, the temperature of the copolymer being maintained between about 70° C. and about 125° C. during the treatment.

17. A process for refining a terpene resinous copolymer of alpha-pinene and another unsaturated polymerizable organic compound which comprises mixing said copolymer resin, dissolved in a solvent, with an acid reactant and a metal above hydrogen in the electromotive series in the presence of at least a small amount of water.

18. A process for refining a terpene resinous copolymer of alpha-pinene and styrene which comprises mixing said copolymer resin, dissolved in a solvent, with sodium acid sulfate and zinc in the presence of at least a small amount of water.

WILLIAM N. TRAYLOR.